Figure 1:
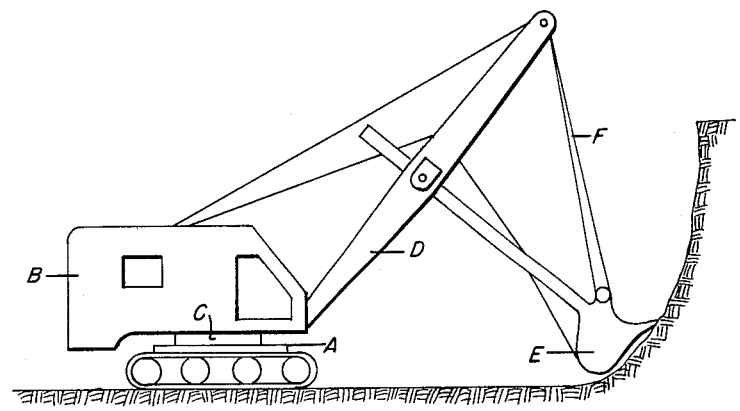

June 28, 1966 N. A. PORVATOV 3,258,301

TURNTABLE UNIT FOR EXCAVATING AND LOAD-CARRYING MACHINES

Filed Sept. 25, 1963

INVENTOR
NICOLAY A. PORVATOV
BY *Glascock, Downing and Seebold*
ATTORNEYS

United States Patent Office 3,258,301
Patented June 28, 1966

3,258,301
TURNTABLE UNIT FOR EXCAVATING AND
LOAD-CARRYING MACHINES
Nicolay Antonovich Porvatov, Moscow, U.S.S.R., assignor to Vsesojuzny Nauchno-Issledovatelsky Institute Stroitelnogo i Dorozhnogo Mashinostrojenija, Moscow, U.S.S.R.
Filed Sept. 25, 1963, Ser. No. 311,359
3 Claims. (Cl. 308—227)

The present invention relates to turntable units for excavating and load handling machines, and more particularly to turntable units of the type utilizing no shaft or king pin and in which both vertical and horizontal loads are carried by antifriction bearings of the ball and tapered roller types.

Double-row ball-type turntables are known, in which one of the raceway rings is integral with the crown gear. Turntables are also known which comprise a single row of tapered rollers, a roller cage with a raceway of rectangular cross-section and a separate crown of the gear having a sloping surface on its internal side which in operation is engaged by the butt ends of the rollers. Also known are other turntable units provided with double rows of ball bearings.

However, all the known types of shaftless turntables possess serious disadvantages and for example, if the crown gear becomes worn or breaks in the first above-mentioned construction, the entire turntable unit must be replaced. On the other hand, in case the annular raceways are poorly or inaccurately machined, the crown gear is also wasted even if the crown gear is made properly, which leads to an increased cost of turntable production.

In the turntables of the second mentioned type, the processing of the raceways, in which each raceway is defined by four parts, is more complicated, and consequently more expensive due to the fact that even the slightest inaccuracy in the machining of any of the parts invariably leads to a rapid wear of the rollers.

Yet another drawback common to all of the known types of turntables is that the same antifriction bearings of the roller type, for example, carry both vertical and horizontal loads, so that the rollers must be designed to withstand the maximum vertical load which in some cases is approximately three times greater than the horizontal load. Consequently, the entire construction is heavier and more expensive.

It is therefore an important object of the present invention to provide a turntable construction having an increased load-carrying capacity, comparatively small weight and reduced friction between the operating parts thereof.

Another object of the present invention is to provide a turntable unit of a simplified construction, as compared with the known types, which is simple both as to manufacture and operation and in which the replacement of worn parts is greatly facilitated.

The aforementioned objects are attained according to the present invention by the provision in a turntable unit of a removable crown of the gear and a row of rollers provided with spherically shaped ends for carrying the vertical load, whereby the load-carrying capacity of the turntable is considerably increased and the sliding friction substantially reduced and a lower row of ball bearings serves for centering the turntable as well as carrying the horizontal load.

The outer cage of the combined double-row bearing means of the present turntable is defined by two rings locked together and fastened by bolts so that the manufacture of the turntable is simplified, while its operation and replacement of worn parts are facilitated.

Figure 2:
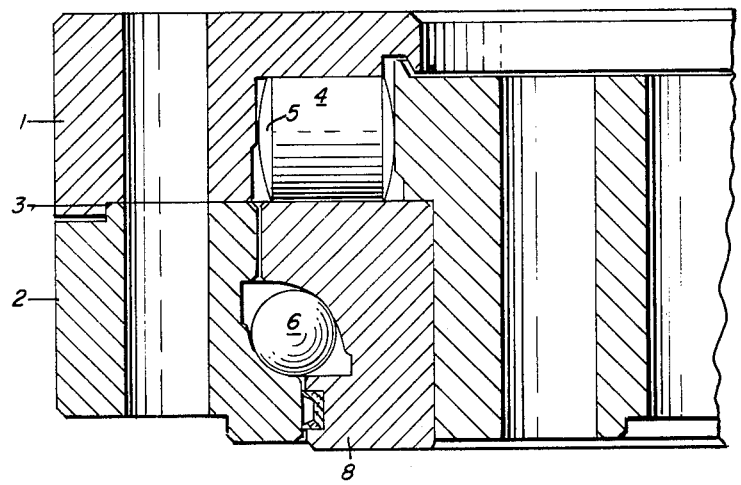

Further objects and advantages of the invention will become more readily apparent from the following detailed description and annexed drawings, and in which drawings:

FIGURE 1 is a view in elevation of an excavating machine equipped with the present turntable unit, and FIGURE 2 is a view in cross section and partly broken away of one of the embodiments of the present turntable.

Referring to the drawings, it will be seen from FIGURE 1 that the excavator comprises a wheeled base A which constitutes a stationary machine member, a cab or the like B mounted for turning movement relative to the base A by means of a turntable assembly denoted generally C and which cab constitutes a movable machine member. The cab is provided with a boom D, a shovel or scoop component E operably related to the boom and cables F for controlling the desired movements imparted to the shovel or scoop E. The boom D, the shovel or scoop E and the cables F may be of conventional type as will be readily appreciated by persons skilled in the art.

The turntable C comprises rings 1 and 2 locked together by a projecting portion which is engaged by a groove 3. The rings constitute the outer raceway for an upper row of rollers 4 which are formed with spherically-shaped end portions 5 for carrying the vertical load, and for a lower row of balls 6 which provide for the alignment or centering of the turntable. The horizontal load is carried by the balls 6 and ring 8 which serves as the inner raceway for said balls. The rings 1 and 2 may be fastened together by bolt means or the like.

By virtue of the present invention there is provided a bearing assembly for turntables which increases the load-carrying capacity of the turntable, reduces the weight thereof and decreases the sliding friction. The assembly includes two types of rolling bodies, namely, balls and rollers with the balls taking up horizontal loads and the overturning torque as well as centering the turntable and the rollers carrying vertical loads. Since the load-carrying capacity of the rollers is several times that of the balls, a substantial saving in manufacture of the turntable is realized.

From the foregoing description, it will be appreciated that the turntable C comprises a first ring which is carried by the stationary machine member A and which constitutes the inner ring of a bearing and a second ring which is carried by the movable machine member B and which defines the outer ring of the bearing. An outer annular track is provided for the first mentioned ring and an inner annular track is provided adjacent the lower portion of the second mentioned ring, with these annular tracks defining an annular raceway. Balls are located in the annular raceway for carrying horizontal loads, the overturning torque and for centering the turntable. An inner rectangular track located adjacent the upper portion of the second mentioned ring cooperates with the upper surface of the first mentioned ring for defining a second annular raceway and rollers are positioned in the second annular raceway for carrying vertical loads.

Although the present invention is described herein in accordance with its preferred embodiment, certain modifications and variations may be made without departing from the spirit and scope of the invention. Such modifications are regarded as falling within the scope of the invention and the appended claims.

What we claim is:

1. A turntable for constructional and load-carrying machines particularly excavators, comprising a stationary machine member, a movable machine member, a first ring carried by the stationary machine member and constituting the inner ring of a bearing, an outer annular track for the ring, a second ring carried by the movable machine member and constituting the outer ring of the bearing, an inner annular track adjacent the lower portion of the second ring, said annular tracks providing an annular raceway, balls positioned in the annular raceway for carrying horizontal loads, the overturning torque and for centering the turntable, an inner rectangular track adjacent the upper portion of the second ring cooperable with the upper surface of the first ring for providing a second annular raceway, and rollers positoned in the second annular raceway for carrying vertical loads.

2. The turntable as claimed in claim 1 wherein the second ring is defined by upper and lower rings secured together.

3. The turntable as claimed in claim 1 wherein the rollers are provided with spherical ends.

References Cited by the Examiner

UNITED STATES PATENTS

| | | | |
|---|---|---|---|
| 2,018,949 | 10/1935 | Couch | 308—174 X |
| 2,427,226 | 9/1947 | Muhlbach | 308—174 X |
| 2,438,542 | 3/1948 | Cushman | 308—231 |
| 2,643,920 | 6/1953 | Olszewski | 308—221 |
| 2,845,312 | 7/1958 | Hollis | 308—227 |
| 2,897,022 | 7/1959 | Marola | 308—208 |
| 3,002,429 | 10/1961 | Franke | 308—230 X |

FOREIGN PATENTS 548,542  9/1956  Italy.

DAVID J. WILLIAMOWSKY, *Primary Examiner.*

ROBERT C. RIORDON, DON A. WAITE, *Examiners.*

FRANK SUSKO, *Assistant Examiner.*